US006700868B2

(12) United States Patent
Smith et al.

(10) Patent No.: US 6,700,868 B2
(45) Date of Patent: *Mar. 2, 2004

(54) SWITCHING REDUNDANCY CONTROL

(75) Inventors: Alexander Smith, Carrollton, TX (US);
Masahiro Shinbashi, Kanagawa (JP);
Edward Qian, Plano, TX (US); Daniel Joseph Mieczkowski, Allen, TX (US);
David Chen, Plano, TX (US)

(73) Assignee: Fujitsu Network Communications, Inc., Richardson, TX (US)

( * ) Notice: Subject to any disclaimer, the term of this patent is extended or adjusted under 35 U.S.C. 154(b) by 43 days.

This patent is subject to a terminal disclaimer.

(21) Appl. No.: 10/067,601

(22) Filed: Feb. 4, 2002

(65) Prior Publication Data

US 2002/0089925 A1 Jul. 11, 2002

Related U.S. Application Data

(63) Continuation of application No. 09/324,948, filed on Jun. 3, 1999, now Pat. No. 6,359,858.

(51) Int. Cl.[7] .......................... H04L 12/28; G06F 15/16
(52) U.S. Cl. .................. 370/217; 370/220; 370/352; 370/401; 379/279; 709/249
(58) Field of Search ................... 370/217, 218, 370/219, 220, 352, 353, 354, 360–401, 221, 225, 235, 242, 244, 226, 392; 714/1, 2, 3, 4; 709/249, 250, 251, 252, 253; 379/279

(56) References Cited

U.S. PATENT DOCUMENTS

| 5,229,990 A | 7/1993 | Teraslinna | 370/60 |
| 5,671,213 A | 9/1997 | Kurano | 370/218 |
| 5,781,527 A | 7/1998 | Read et al. | 370/216 |
| 5,848,227 A | * 12/1998 | Sheu | 370/217 |
| 5,884,046 A | 3/1999 | Antonov | 395/200 |
| 6,144,633 A | * 11/2000 | Ikeda et al. | 370/217 |
| 6,359,858 B1 | * 3/2002 | Smith et al. | 370/217 |

FOREIGN PATENT DOCUMENTS

| CA | 0818940 A2 | * 1/1998 | |
| EP | 0818940 | 1/1998 | .......... H04Q/11/04 |

OTHER PUBLICATIONS

Rathgeb, E.P.: "Redundancy Concepts For a Large ATM Switching Node", Iss. World Telecommunications Congress. (International Switching Symposium), CA, Toronto, Pinnacle Group, Sep. 21, 1997, pp. 425–433, XP000720548, the whole document, Sep. 1997.

* cited by examiner

Primary Examiner—Chi Pham
Assistant Examiner—Afsar M. Qureshi
(74) Attorney, Agent, or Firm—Baker Botts L.L.P.

(57) ABSTRACT

An apparatus and method for switching redundancy control which provides fast switching from a malfunctioning component to a redundant component with minimum data flow interruption for both transmitted and received data. The redundancy control system having an APS (Automatic Protection Switching) Hub, at least a working and a redundant tributary card, a bridge to provide identical traffic to the working and redundant tributary cards, a working and a redundant STM switching fabric, selectors within the working and redundant STM switching fabrics for selecting the traffic from the working tributary card to further process, a working and a redundant ATM switching fabric, a working and a redundant ATM processor and ATM selectors for selecting traffic needing cell switching from the working STM switching fabric to process further. The system is capable of monitoring itself to detect failures and the APS Hub is outfitted so as to become aware of detected failures and initiate a switch in the appropriate selectors or ATM selectors so as to change the traffic being further processed from the failed working component to the redundant component.

22 Claims, 4 Drawing Sheets

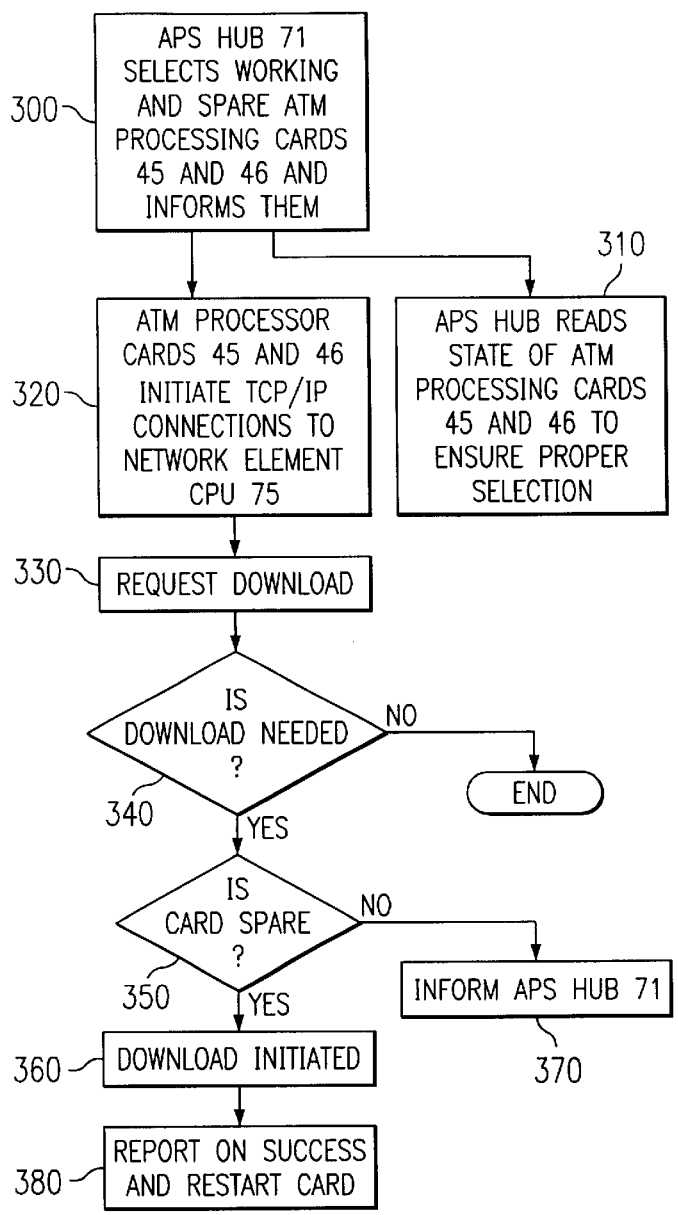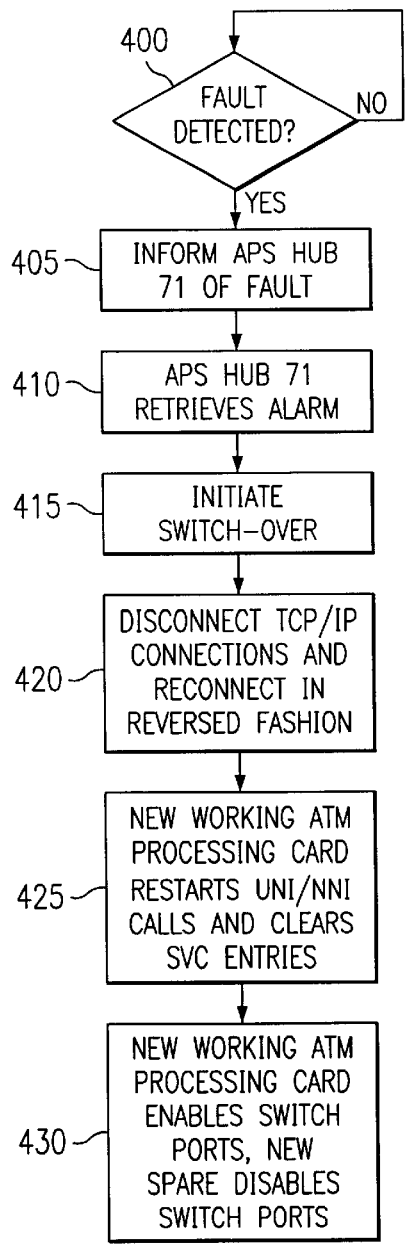

SWITCHING REDUNDANCY CONTROL

CROSS-REFERENCE TO RELATED APPLICATIONS

This application is a continuation of U.S. application Ser. No. 09/324,948, filed Jun. 3, 1999, by Alexander Smith, Masahiro Shinbashi, Edward Qian, Danile Mieczkowshi, and David Chen and entitled "Switching Redundancy Control", now U.S. Pat. No. 6,359,858 B1.

TECHNICAL FIELD OF THE INVENTION

The present invention relates generally to a switching to redundancy control method and system for providing fast switching from a malfunctioning working component to a redundant component with minimum data flow interruption for both transmitted and received data.

BACKGROUND OF THE INVENTION

Telecommunication service providers today face an ever increasing amount competition. Competitive local exchange carriers and traditional long distance carriers are entering the local telecommunications services market, while the Regional Bell Operating Companies are attempting to enter the long distance telecommunications services market. This dramatic increase in competition makes it imperative that the quality of service provided by a telecommunication service provider be extremely high. If telecommunications customers find their service interrupted, it is very easy for them to switch to another service provider.

Although the quality of manufacture of telecommunications equipment is increasing, along with better manufacturing techniques and materials technologies, failures still to do occur on components within telecommunications systems. Because of the increased competition in the service provider market, it is very important that the service interruptions caused by failures are minimized in terms of data loss or delay. Providing redundancy within telecommunications equipment is one way to address these concerns.

Redundancy within telecommunications equipment has been provided in the past. However, typically, the redundancy control systems; are complex and/or are not quick enough to switch between a working component with a failure and a redundant component for today's heavy data traffic loads and high data rates.

Thus, a need has arisen for a non-complex, yet quick, switching redundancy control method and apparatus.

SUMMARY OF THE INVENTION

The present invention provides an apparatus and method for switching redundancy control which provides fast switching from a malfunctioning component to a redundant component with minimum data flow interruption for both transmitted and received data. The invention does so by providing an APS (Automatic Switching Protection) Hub, at least a working and a redundant tributary card, a bridge to provide identical traffic to the working and redundant tributary cards, a working and a redundant STM switching fabric, selectors within the working and redundant STM switching fabrics for selecting the traffic from the working tributary card to further process, a working and a redundant ATM switching fabric, a working and a redundant ATM processor and ATM selectors for selecting traffic needing cell switching from the working STM switching fabric to process further. Other data switching fabrics and processors, such as frame relay, could also be used instead of, or in addition to, ATM. The system is capable of monitoring itself to detect failures and the APS Hub is outfitted so as to become aware of detected failures and initiate a switch in the appropriate selectors or ATM selectors go as to change the traffic being further processed from the failed working component to the redundant component.

Thus, it is an object of the present invention to provide a non-complex system and method for fast switching between working and redundant components in a telecommunications network element when a fault occurs on the working component.

It is a further object of the present invention to provide for the fast switching between a working and redundant tributary card when the working card is experiencing faults so as to minimize traffic loss.

It is a further object of the present invention to provide for the fast switching between a working and redundant STS switching fabric when the working fabric is experiencing faults so as to minimize traffic loss.

It is a further object of the present invention to provide for the fast switching between a working and redundant VT switching fabric when the working fabric is experiencing faults so as to minimize traffic loss.

It is a further object of the present invention to provide for the fast switching between a working and redundant ATM processor card when the working card is experiencing faults so as to minimize traffic loss.

It is a further object of the present invention to provide for the fast switching between a working and redundant ATM switching fabric when the working fabric is experiencing faults so as to minimize traffic loss.

BRIEF DESCRIPTION OF THE DRAWINGS

These and other objects and advantages of the present invention will become apparent and more readily appreciated by reference to the description of the preferred embodiments, taken in conjunction with the accompanying drawings, of which:

FIG. 6 is a flow chart of a redundancy control method for initialization of ATM processor cards and ATM switching fabrics according to an embodiment of the present invention; and FIG. 7 is a flow chart of a redundancy control method for ATM processor cards and ATM switching fabrics according to another embodiment of the present invention.

DETAILED DESCRIPTION OF THE PREFERRED EMBODIMENTS

The present invention will be better understood by reference to the accompanying drawings.

Figure 1:
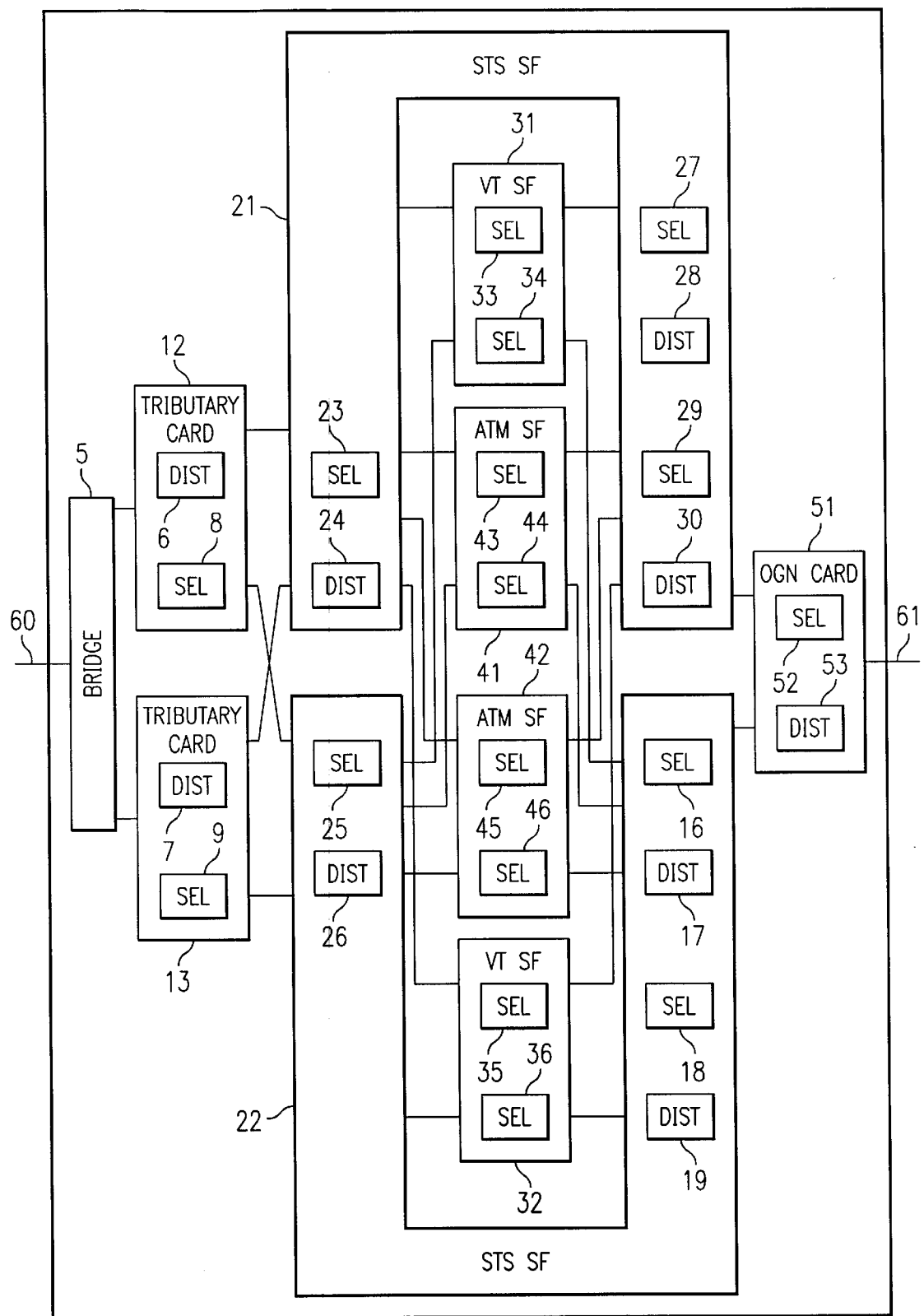
FIG. 1 is a block diagram of a network element according to an embodiment of the present invention.

FIG. 1 depicts a network element 11 having a redundancy control system of an embodiment of the present invention.

Network element 11 may be of the type discussed in co-pending application Ser. No. 09/324,721 entitled "Dialable Data Services/TDM Bandwidth Management". Preferably, redundancy is provided at each level through which user traffic flows.

To support operation in a redundant mode, user traffic entering network element 11 through line 60 is bridged by bridge 5 to redundant tributary cards 12 and 13. This bridging may be accomplished in several known ways that would permit operation of network element 11 in both a redundant mode and a non-redundant mode. One implementation would include backplane access from the rear of tributary cards 12 and 13 for operation in both modes. Another option would include rear access for redundant mode and front access for non-redundant mode. This approach might require that two separate types tributary cards be designed though. A third approach could include a backplane that does not support redundant mode but instead utilizes a special designed Y-cable for providing bridging. Other specific implementations may, exist as well. Tributary cards 12 and 13 may be LAN cards, frame relay cards, POTs cards or any other type of tributary or line card.

When network element 11 is operating in a redundant mode, one of tributary cards 12 and 13 is designated to be working (tributary card 12, for instance) and the other is designated to be redundant (tributary card 13, for instance). Preferably, tributary cards 12 and 13 are located adjacent to one another to minimize the distance between the cards and thereby minimize the time required for a switch-over when working tributary card 12 experiences problems.

STS switching fabrics 21 and 22 both receive processed traffic from tributary cards 12 and 13 and are capable of switching STS-n level signals. In a redundant mode, one of STS switching fabrics 21 and 22 is designated working (STS switching fabric 21 for instance) and the other is designated redundant (STS switching fabric 22 for instance). Although STS switching fabrics, 21 and 22 receive processed traffic from both tributary cards 12 and 13, they only select traffic from the working tributary card (in this case, tributary card 12) for further transmission.

Similarly, in the other direction, traffic from both STS switching fabrics 21 and 22 is bridged to both tributary cards 12 and 13, while only working tributary card 12 forwards traffic to line 60.

Also provided in network element 11 are VT switching fabrics 31 and 32, one of VT switching fabrics 31 and 32 being designated as working (VT switching fabric 31 for instance) and one being designated as redundant (VT switching fabric 32 for instance). VT switching fabrics 31 and 32 are capable of switching virtual tributary (VT-n) signals. ATM witching fabrics 41 and 42 are also provided, one of ATM switching fabrics 41 and 42 being designated as working (ATM switching fabric 41 for instance) and one being designated as redundant (ATM switching fabric 42 for instance). ATM switching fabrics 41 and 42 are capable of ATM cell switching. VT switching fabrics 31 and 32 receive traffic from STS switching fabrics 21 and 22 that has been designated as needing VT switching. Likewise, VT switching fabrics 31 and 32 provide VT switched traffic to STS switching fabrics 21 and 22. ATM switching fabrics 41 and 42 receive traffic from STS switching fabrics 21 and 22 that are in need of cell switching and provide cell switched traffic to STS switching fabrics 21 and 22.

Aggregate card 51 receives traffic from STS switching fabrics 21 and 22. Aggregate card 51 may be an OC-n card, for example. Aggregate card 51 then processes only traffic from active STS switching fabric 21 for transmission out of network element 11 through line 61. Incoming traffic from line 61 is provided to both STS switching fabrics 21 and 22. It should be realized that a redundant aggregate card could be provided also.

Operation of APS (Automatic Protection Switching) distribution blocks, such as 6, 7, 24, 26, 28, 30, 17, 19 and 53, and APS selection blocks, such as 8, 9, 23, 25, 33, 34, 43, 44, 45, 46, 35, 36, 27, 29, 16, 18 and 52, will be described by way of example in reference to FIG. 2.

Figure 2:
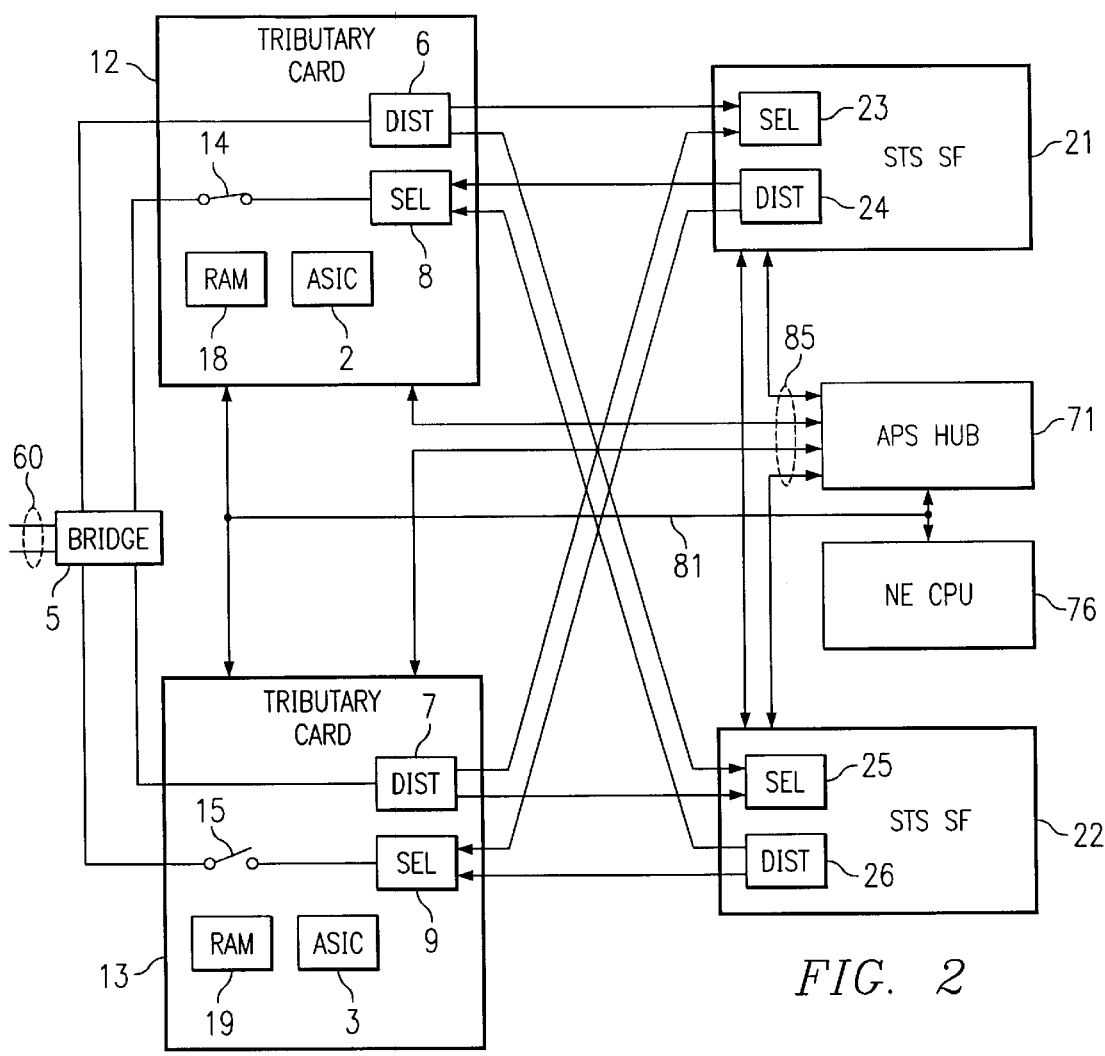
FIG. 2 is a block diagram of a redundancy control system according to an embodiment of the present invention.

FIG. 2 shows the details of the redundancy control system of an embodiment of the present invention as it relates to traffic flowing between the tributary cards and the STS switching fabric.

Traffic flowing to tributary cards 12 and 13 from STS switching fabrics 21 and 22 is bridged to both tributary cards 12 and 13 by APS (Automatic Protection Switching) distribution blocks 24 and 26 in STS switching fabrics 21 and 22, respectively. This is accomplished through logic and/or software within APS distribution blocks 24 and 26. Design of such bridging functions would be within the capabilities of one skilled in the art.

The STS switching fabrics 21 and 22 receive traffic from both tributary cards 12 and 13 through APS selectors 23 and 25 respectively. APS selectors 23 and 25 select traffic received from only working tributary card 12 to pass on. This may be accomplished through logic and/or software within APS selectors 23 and 25.

Tributary cards 12 and 13 should preferably be designed to detect hardware/software failures. Some methods of doing so would include designing parity checks on address and data buses, providing ASICs 2 and 3 with the capability to self check, or providing diagnostic I software that periodically runs diagnostics when ports are not actively transmitting or receiving traffic. Other methods may exist as well. Design of such features would be within the capabilities of one skilled in the art.

The two tributary cards 12 and 13 should appear as one card to other telecommunications network elements. If tributary cards 12 and 13 are LAN cards, for instance, they should have the same Media Access Controller (MAC) address. To achieve this, network element CPU 76 reads the MAC address from non-volatile RAM 18 in working tributary card 12 and writes it to redundant tributary card 13 into non-volatile RAM.

Preferably, tributary cards 12 and 13 both are active at the same time. That means both would actively process any traffic received from either direction. This will assist in minimizing the time it takes redundant tributary card 13 to become working in the event of a problem with working tributary card 12, since switch-over would basically amount to only flipping a switch in APS selectors 23 and 25 and relays 14 and 15 on the transmit path of tributary cards 12 and 13 as discussed below with regard to FIG. 3. Although redundant tributary card 13 would be actively processing data, its data would be thrown away while it remained in the redundant mode at the APS selectors 23 and 25.

Operation of relays 14 and 15 is now described. Tributary cards 12 and 13 have relays 14 and 15, respectively, in series with the path of traffic flowing to bridge 5 out to line 60. During operation of network element 11, relay 14 of working tributary card 12 will be closed, allowing traffic to flow to bridge 5, while relay 15 of redundant tributary card 13 will be opened, prohibiting traffic from flowing to bridge 5. That way, only traffic from the working card is passed onto line 60. Should tributary card 12 experience problems and tributary card 13 become the working card, then relay 14 will be opened and relay 15 will be closed so that only traffic from tributary card 13 would flow through bridge 5 to line 60.

APS selectors 8, 9, 33, 34, 35, 36, 43, 44, 45, 46, 27, 29, 16, 18 and 52 shown in FIG. 1, perform the same function for the signals provided to them as do APS selectors 23 and 25 described above. APS distributors 6, 7, 28, 30, 17, 19 and 53, shown in FIG. 1, perform the same function for the signals provided to them as do APS distributors 24 and 26 described above. They may be implemented in the same fashion or in a different fashion by one skilled in the art. For simplicity purposes, separate description of their operation will not be provided.

Figure 3:
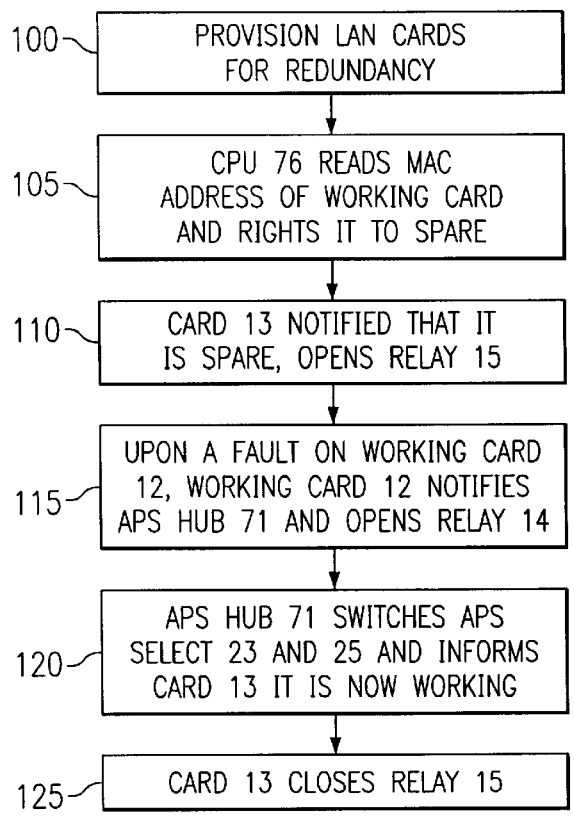
FIG. 3 is a flow chart of a redundancy control method for tributary cards according to an embodiment of the present invention.

FIG. 3 depicts the process undertaken by network element 11 in the redundancy control method according to an embodiment of the present invention. In this embodiment, tributary cards 12 and 13 are LAN cards and are provisionable by a network operator (not shown) to act in a non-redundant mode or a redundant mode.

In step 100, a network operator provisions tributary cards 12 and 13 for a redundancy mode. Once the network operator has selected tributary cards 12 and 13 to operate in a redundancy mode, the network element CPU 76 reads the MAC address of working tributary card 12 and writes it to redundant tributary card 13 in step 105. Preferably, the MAC address is written into non-volatile RAM. In step 110, network element CPU 76 then notifies tributary card 13 that is a redundant and opens relay 15 on tributary card 13. In step 115, when working tributary card 12 has detected the presence of a failure on itself that necessitates a switch-over to redundant tributary card 13, it informs APS Hub 71 of the unit failure on serial point-to-point overhead link 85 and opens relay 14 in its transmit path to line 60 so as to cease transmitting to line 60. APS Hub 71 then switches APS selectors 23 and 25 in STS switching fabrics 21 and 22, respectively, so the traffic to be processed by STS switching fabrics 21 and 22 will now be from tributary card 13 and informs tributary card 13 through parallel bus 81 that it is now the working card in step 120. In step 125, relay 15 in new working card 13 then closes to allow traffic to be transmitted through bridge 5 onto line 60.

Figure 4:
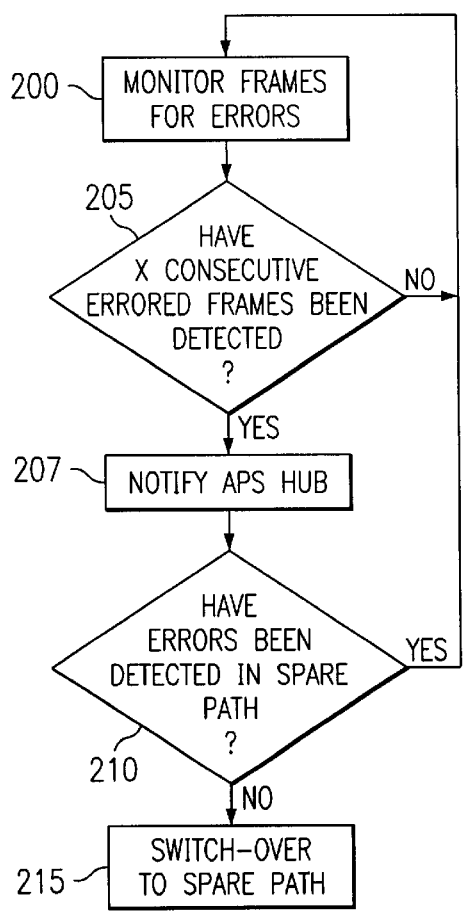
FIG. 4 is a flow chart of a redundancy control method for switching fabrics according to another embodiment of the present invention.

As discussed above, STS switching fabrics 21 and 22 and VT switching fabrics 31 and 32 are set up in a redundancy mode. FIG. 4 shows a criteria for switch-over between working STS switching fabric 21 and redundant STS switching fabric 22 and between working VT switching fabric 31 and redundant VT switching fabric 32 according to an embodiment of the present invention. This may be implemented in software in network element 11. In step 200, both working switching fabric and redundant switching fabric are monitored for frame errors. This monitoring can be done in much the same fashion as with tributary cards 12 and 13 described above. In step 205, a decision is made as to whether or not there have been a predetermined number of consecutively errored frames in the working switching fabric. The predetermined number could be any integer, such as three. Alternatively, the system could be set up so that it looks for a predetermined percentage of errored frames after detecting a first errored frame or a predetermined number of errored frames within a preset time.

If the predetermined number of consecutive errored frames has not been reached, step 200 is repeated. If the predetermined number of consecutively errored frames has been reached, working switching fabric notifies APS Hub 71 through serial point-to-point overhead link 85 in step 207.

APS Hub 71 then checks with the redundant switching fabric through serial point-to-point overhead link 85 to determine whether the redundant switching fabric is experiencing frame errors in step 210. The fame or different method and criteria can be applied to determine if the redundant switching fabric is experiencing frame errors. If it is, step 200 is repeated. If it is not, a switch-over is initiated in step 215. In the case that STS switching fabrics 21 and 22 are being switched, APS Hub 71 APS selectors 8 and 9 in tributary cards 12 and 13, respectively, so that the traffic to be processed by tributary cards 12 and 13 from will now to be from STS switching fabric 22 and informs STS switching fabric 22 through parallel bus 81 that it is now the working switching fabric. In the case that VT switching fabrics 31 and 32 are being switched, APS Hub 71 APS distributors 24 and 26 in STS switching fabric 21 and 22, respectively, so the traffic passed on by STS switching fabrics 21 and 22 will now be from VT switching fabric 22 and informs VT switching fabric 22 through parallel bus 81 that it is now the working switching fabric. Preferably a switch-over will not be immediately reversible. This will prevent bouncing between the two fabrics when noisy traffic conditions exist.

Figure 5:
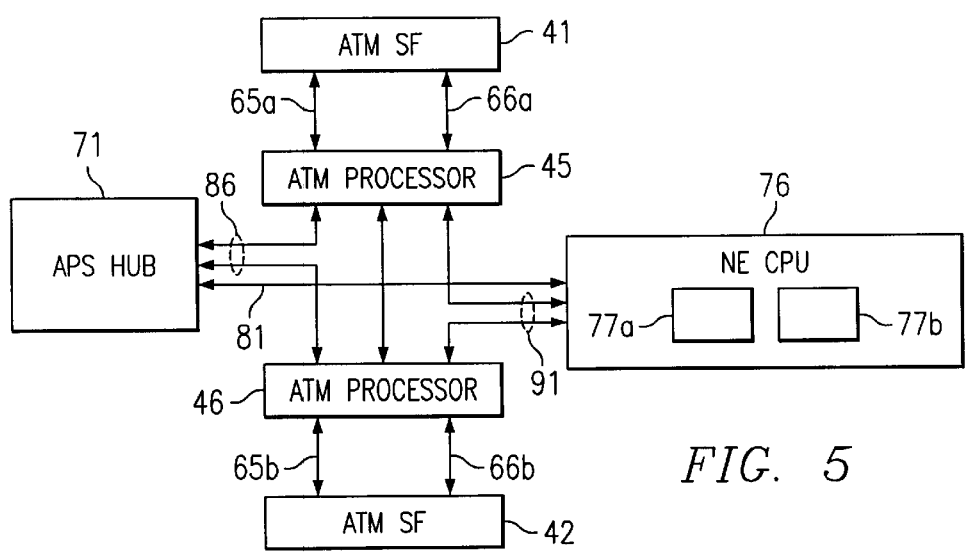
FIG. 5 is a block diagram of a redundancy control system according to another embodiment of the present invention.

Redundancy control for the ATM switching fabrics may be handled as shown in FIG. 5. As shown in FIG. 5, network element 11 contains ATM switching fabrics 41 and 42 and ATM processor cards 45 and 46. The ATM processors found on ATM processor cards 45 and 46 could alternatively reside on the same card as the ATM switching fabrics 41 and 42 respectively. For purposes of redundancy control, under an embodiment of the present invention, ATM switching fabric 41 and ATM processor card 45 are handled as a single unit in terms of redundant switching protection. The same is true for ATM switching fabric 42 and 46.

Each ATM processor card 45 and 46 has a dedicated connection 65a and 65b, respectively, to its respective ATM switching fabric card's CPU for sending and receiving signaling and messages, such as PNNI and ILMI messages. Such a connection is preferably through a AAL5 SAR device (not shown). Each ATM processor card 45 and 46 is also connected to its respective ATM switching fabric card 41 and 42 through a respective control bus 66a and 66b. These control busses 66a and 66b are used to provide access to ATM switching fabric registers (not shown) and for receiving interrupts from ATM switching fabrics 41, and 42. Software on ATM processor cards 45 and 46 uses a safe read and safe write function to read and write to ATM switching fabric registers. Each ATM processor card 45 and 46 is connected to network element CPU 76 via a TCP/IP connection over HDLC link 91. This connection permits the downloading of provisioned ATM databases to the ATM processor cards 45 and 46. Programming of connection tables in the switching fabric can be done by ATM processor cards 45 and 46 either through inband control cells through dedicated connections 65a and 65b CPU port or through commands through control busses 66a and 66b, respectively.

Two sets of parallel bus registers 77a and 77b to which the ATM processor cards 45 and 46 and APS Hub 71 write to and read from exist—one for each set of ATM processor cards/ATM switching fabric cards. Sets of registers 77a and 77b each includes an ATM processor card present, ATM switching fabric card present, activity request to ATM processor card, and ATM processor card status register.

ATM processor cards 45 and 46 and network element CPU 76 are connected by HDLC link 91. ATM processor card kernel software provides a pNA software layer on top of HDLC link 91 for TCP/IP stack functionality.

FIGS. 6 and 7 depict a redundancy control method according to an embodiment of the present invention for handling ATM switching fabrics and ATM processor cards.

In FIG. 6, the initialization sequence upon booting up according to an embodiment of the present invention is shown. In step 300, APS Hub 71 decides which of ATM processor cards 45 and 46 will be working and updates registers 77a and 77b via parallel bus 81. When registers 77a and 77b are updated by the APS Hub 71, the respective ATM processor cards 45 and 46 will get an interrupt over parallel bus 81 and read their respective registers 77a and 77b. In step 310, ATM processor cards 45 and 46 then inform APS Hub 71 of their state by updating their respective status registers within registers 77a and 77b. APS Hub 71 checks the status of the status registers within 77a and 77b to ensure ATM processor cards 45 and 46 have accepted their assignments. States that can be stored in status registers within 77a and 77b include both nonfunctional and functional states. Functional states include redundant, working and in a download. The nonfunctional states include diagnostics, ATM switching fabric diagnostics, booting and reset. The APS Hub 71 can initiate interrupts due to manual switching, initial 15 provision or fault detection.

In step 320, ATM processor cards 45 and 46 initiate TCP/IP connections to network element CPU's 75 IP address over HDLC link 91 through known socket ports. There are separate known socket ports (not shown) for the working and redundant state of the ATM processor cards. Network element CPU's 75 server software listens to these two socket ports. The working ATM processor card 45 connects to the active socket port and redundant ATM processor card 46 connects to the inactive socket port. In step 330, upon the connection, the ATM processor cards 45 and 46 send a database download request message to network element CPU 75. This message preferably includes the ATM processor card's software version, activity state, database version, the latest IPP transaction ID and time. In step 340, it is determined if a database or a software download is needed. If so, in step 350 it is checked to determine if the card needing the download is a redundant. If the card is a redundant, the download occurs in step 360. If not, in step 370, the APS Hub can be notified. When the software download is completed, in step 380, the ATM processor card 45 or 46 informs network element CPU 75 whether or not the download was successful and then restarts itself.

When IPP messages are needed to be sent by network element CPU to ATM processor cards 45 and 46, they are sent first to working ATM processor card 45. Once working ATM processor card 45 returns a success response, the message is forwarded to redundant ATM processor card 46 by network element CPU 75. It is not necessary that the redundant ATM processor card 46 receive IPP messages from network element CPU 75. Instead, the working ATM processor card 45 can be responsible for sending IPP messages to the redundant ATM processor card 46. However, this would require additional software in the working ATM processor card 45 to recreate IPP messages from its database and send them to the redundant ATM processor card 46 when a new redundant ATM processor card 46 is inserted.

FIG. 7 shows redundancy control method according to an embodiment of the present invention for handling ATM switching fabrics and ATM processor cards when faults are detected.

Each ATM processor card 45 and 46 detect faults when they occur, such as LCD alarms. In step 400 such a fault is detected. Upon detection of an alarm, ATM processor cards 45 and 46 report the alarm to APS Hub 71 in step 405. When APS Hub 71 receives a fault interrupt from ATM processor card 45 or 46, it realizes there is an ATM processor card failure or an ATM switching fabric failure. In step 410, APS Hub 71 retrieves the alarms from the working ATM processor card's 45 parallel bus registers 77a. Preferably, VP protection is performed in both ATM processor cards 45 and 46. The reason for the fault can be a stored in parallel bus register 77a or 77b or, alternatively, software residing on the ATM processor card could issue an interrupt with the reason for the fault. A number of faults can be used including: software watch dog timeout; card pullout; power-up restart; front panel reset; ATM processor card memory bus error; illegal instruction; PCI bus error; Utopia parity error; ATM switching fabric memory parity error; ATM switching fabric memory bus error; software bus error; ATM processor card insert; ATM processor card pull-out; ATM switching fabric insert; and ATM switching fabric pullout.

In step 415, a APS Hub 71 initiates a switch-over. When a switch-over occurs, in step 420, each of ATM processor cards 45 and 46 shuts down the TCP/IP connection and reconnects with reversed socket ports so that the new working ATM processor card 46 is now connected to the working socket port and the new redundant ATM processor card 45 is connected to the redundant socket port. The ATM processor cards 45 and 46 will also each shut down its connection if a reset/fault trigger causes the transition to a nonfunctional state.

When redundant ATM processor card 46 goes from the redundant state to the working state in step 425, it enables the SAR signaling AAL5 connections. Restart messages are sent to all the UN/NNI interfaces requesting the peers to restart all the active UN/NNI calls. The SVC entries in the database and in the ATM switching fabric are then cleared before accepting any new calls.

In ATM communications, duplicate cells cannot be transmitted by a switch and cell ordering must be maintained. In order to achieve this, the redundant ATM processor card 46 will disable its switch ports for both receiving and transmitting. This way, no cells can be queued in. Thus in step 430, when the redundant ATM processor card 46 becomes working, it enables the switch ports and when the working ATM processor card 45 becomes redundant, it flushes its buffers and disables its switch ports.

Although the preferred embodiments of the present invention have been described and illustrated in detail, it will be evident to those skilled in the art that various modifications and changes may be made thereto without departing from the spirit and scope of the invention as set forth in the appended claims and equivalents thereof.

What is claimed is:

1. A tributary card comprising:
    an automatic protection switching (APS) distribution module operable to couple to a tributary line, to a first switching fabric, and to a second switching fabric, the distribution module further operable to forward copies of traffic received from the tributary line to the first switching fabric and to the second switching fabric;
    an APS selection module operable to couple to the tributary line, to the first switching fabric, and to the second switching fabric, the selection module further operable to forward traffic received from a selected one of the first switching fabric and the second switching fabric to the tributary line;
    a relay coupled between the selection module and the tributary line; and
    a controller providing a first mode of operation and a second mode of operation:
        in the first mode of operation, the tributary card maintaining the relay in a closed position and the controller monitoring for failure of the tributary card; and in the second mode of operation, the tributary card maintaining the relay in an open position.

2. The tributary card of claim 1, wherein the controller is further operable, in response to detecting a failure of the tributary card in the first mode of operation, to switch the tributary card to the second mode of operation, thus opening the relay.

3. The tributary card of claim 2, wherein the controller is further operable, in response to detecting a failure of the tributary card in the first mode of operation, to communicate a failure notification to an APS hub using a serial, point-to-point link between the controller and the APS hub.

4. The tributary card of claim 1, wherein the controller is further operable, in the second mode of operation, to receive notification to act as a working card and, in response, to switch the tributary card to the first mode of operation, thus closing the relay.

5. The tributary card of claim 1, wherein the controller is further operable to receive the notification from an APS hub using a parallel communication link between the controller and the APS hub.

6. The tributary card of claim 1, wherein the controller is further operable to monitor for failure of the tributary card by detecting a cessation of traffic received from the tributary line and a cessation of traffic received from the selected one of the first switching fabric and the second switching fabric and, in response, initiating diagnostics of the tributary card.

7. The tributary card of claim 1, further comprising a memory element maintaining a media access control (MAC) address assigned to the tributary card.

8. A method for redundancy control, the method comprising the steps of:
   identifying a first card and a second card, each of the first card and the second card having a relay and a memory element operable, wherein the first card is provisioned as working and the second card is provisioned as redundant;
   determining an media access control (MAC) address stored in the memory element of the first card;
   communicating the MAC address to the second card for storage in the memory element of the second card;
   instructing the second card to open the relay on the second card;
   receiving a notification of failure of the first card; and
   in response to the notification, instructing the second card to close the relay on the second card.

9. The method of claim 8, further comprising, in response to the notification, instructing a switching fabric to receive packet data from the second card rather than packet data from the first card.

10. The method of claim 8, further comprising receiving the notification from the first card, the notification indicating that the first card has opened the relay on the first card.

11. The method of claim 8, wherein the relay of the first card couples between a switching fabric and a tributary line, and the relay of the second card couples between the switching fabric and the tributary line, each of the relays operable when closed to permit traffic from the switching fabric to the tributary line and when open to inhibit traffic from the switching fabric to the tributary line.

12. The method of claim 8, further comprising, in response to receiving a notification of failure of a first switching fabric:
   instructing the first card to switch from processing communications received from the first switching fabric to processing communications received from a second switching fabric; and
   instructing the second card to switch from processing communications received from the first switching fabric to processing communications received from the second switching fabric.

13. The method of claim 12, wherein the first switching fabric and the second switching fabric each comprise asynchronous transfer mode (ATM) switching fabrics.

14. The method of claim 13, further comprising, in response to receiving the notification of failure of the first switching fabric:
   instructing a first ATM processor card associated with the first switching fabric to disable receiving and transmitting switch ports on the first ATM processor card; and
   instructing a second ATM processor card associated with the second switching fabric to disable receiving and transmitting switch ports on the second ATM processor card.

15. Logic for redundancy control, the logic embodied in a medium and operable when executed to perform the steps of:
   identifying a first card and a second card, each of the first card and the second card having a relay and a memory element, wherein the first card is provisioned as working and the second card is provisioned as redundant;
   determining an media access control (MAC) address stored in the memory element of the first card;
   communicating the MAC address to the second card for storage in the memory element of the second card;
   instructing the second card to open the relay on the second card;
   receiving a notification of failure of the first card; and
   in response to the notification, instructing the second card to close the relay on the second card.

16. The logic of claim 15, further operable, in response to the notification, to instruct a switching fabric to receive packet data from the second card rather than packet data from the first card.

17. The logic of claim 15, further operable to receive the notification from the first card, the notification indicating that the first card has opened the relay on the first card.

18. The logic of claim 15, wherein the relay of the first card couples between a switching fabric and a tributary line, and the relay of the second card couples between the switching fabric and the tributary line, each of the relays operable when closed to permit traffic from the switching fabric to the tributary line and when open to inhibit traffic from the switching fabric to the tributary line.

19. The logic of claim 15, further operable, in response to receiving a notification of failure of a first switching fabric:
   to instruct the first card to switch from processing communications received from the first switching fabric to processing communications received from a second switching fabric; and
   to instruct the second card to switch from processing communications received from the first switching fabric to processing communications received from the second switching fabric.

20. The logic of claim 19, wherein the first switching fabric and the second switching fabric each comprise asynchronous transfer mode (ATM) switching fabrics.

21. The logic of claim 20, further operable, in response to receiving the notification of failure of the first switching fabric:
   to instruct a first ATM processor card associated with the first switching fabric to disable receiving and transmitting switch ports on the first ATM processor card; and to instruct a second ATM processor card associated with the second switching fabric to disable receiving and transmitting switch ports on the second ATM processor card.

22. An automatic protection switching hub comprising:

means for identifying a first card and a second card, each of the first card and the second card having a relay and a memory element, wherein the first card is provisioned as working and the second card is provisioned as redundant;

means for determining an media access control (MAC) address stored in the memory element of the first card;

means for communicating the MAC address to the second card for storage in the memory element of the second card;

means for instructing the second card to open the relay on the second card;

means for receiving a notification of failure of the first card; and means for, in response to the notification, instructing the second card to close the relay on the second card.

* * * * *

UNITED STATES PATENT AND TRADEMARK OFFICE
CERTIFICATE OF CORRECTION

PATENT NO. : 6,700,868 B2
DATED : March 2, 2004
INVENTOR(S) : Smith et al.

It is certified that error appears in the above-identified patent and that said Letters Patent is hereby corrected as shown below:

Column 1,
Line 7, after "Qian", delete "Danile", and insert -- Daniel --.
Line 21, after "amount", insert -- of --.
Line 33, after "still", delete "to".
Line 56, after "Automatic" delete "Switching Protection", and insert -- Protection Switching --.

Column 2,
Line 4, after "ATM selectors", delete "go".
Line 52, after "invention", delete "." and insert -- ; --.

Column 3,
Line 16, after "types", insert -- of --.
Line 52, after "ATM", delete "witching", and insert -- switching --.

Column 6,
Line 4, after "The", delete "fame", and insert -- frame --.
Line 9, after "APS Hub 71", insert -- switches --.
Line 11, after "13", delete "from".
Line 11, after "now" delete "to".
Line 42, after "41", delete ",".

Signed and Sealed this

Fourteenth Day of September, 2004

JON W. DUDAS
*Director of the United States Patent and Trademark Office*